US012802085B2

(12) United States Patent
Pomerantz et al.

(10) Patent No.: US 12,802,085 B2
(45) Date of Patent: Nov. 17, 2026

(54) SYSTEMS AND METHODS FOR GREENHOUSE GAS EMISSION QUANTIFICATION AND REDUCTION

(71) Applicant: Schlumberger Technology Corporation, Sugar Land, TX (US)

(72) Inventors: Andrew Emil Pomerantz, Cambridge, MA (US); Gabriela Scamparini, Houston, TX (US); Kiona Meade, Houston, TX (US); Marcus Suzart Ungaretti Rossi, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 15 days.

(21) Appl. No.: 18/687,943

(22) PCT Filed: Sep. 3, 2021

(86) PCT No.: PCT/US2021/048977
§ 371 (c)(1),
(2) Date: Feb. 29, 2024

(87) PCT Pub. No.: WO2023/033832
PCT Pub. Date: Mar. 9, 2023

(65) Prior Publication Data
US 2024/0403892 A1 Dec. 5, 2024

(51) Int. Cl.
*G06Q 30/018* (2023.01)

(52) U.S. Cl.
CPC .................................. *G06Q 30/018* (2013.01)

(58) Field of Classification Search
CPC .................................................... G06Q 30/018
(Continued)

(56) References Cited

U.S. PATENT DOCUMENTS 8,332,063 B2 12/2012 Moshier
8,666,699 B1 3/2014 Grube
(Continued)

FOREIGN PATENT DOCUMENTS

CA 2325966 C * 5/2008 ......... B01D 53/8668
CA 2717164 A1 * 9/2009 ............. G06Q 99/00
(Continued)

OTHER PUBLICATIONS

Y.P. et al."Planning regional energy system in association with greenhouse gas mitigation under uncertainty", Applied Energy 88, 2011, 599-611 (Year: 2011).*
(Continued)

*Primary Examiner* — Akiba K Robinson
(74) *Attorney, Agent, or Firm* — Kyle R. Miiller

(57) ABSTRACT

Systems and methods presented herein generally relate to a method that includes providing one or more recommendations relating to greenhouse gas emission reduction goals to a customer. The method also includes receiving one or more greenhouse gas emission reduction goals from the customer. The one or more greenhouse gas emission reduction goals relate to a reduction in greenhouse gas emissions at one or more oil and gas worksites associated with the customer. The method also includes determining a greenhouse gas emission reduction plan to reduce the greenhouse gas emissions at the one or more oil and gas worksites to achieve the one or more greenhouse gas emission reduction goals. The method further includes performing work to implement the greenhouse gas emission reduction plan. The method also includes collecting and analyzing greenhouse gas emission measurements to ensure that the one or more greenhouse gas emission reduction goals have been achieved by the greenhouse gas emission reduction plan.

16 Claims, 4 Drawing Sheets

(58) Field of Classification Search
USPC .................................................. 705/317, 1.1
See application file for complete search history.

(56) References Cited

U.S. PATENT DOCUMENTS

| | | | |
|---|---|---|---|
| 9,322,735 | B1 | 4/2016 | Tan |
| 10,677,771 | B2 | 6/2020 | Dittberner |
| 11,416,643 | B2 | 8/2022 | Daly |
| 11,454,622 | B2 | 9/2022 | Billat |
| 2004/0035179 | A1 | 2/2004 | Koch |
| 2005/0257227 | A1 | 11/2005 | Ritchy |
| 2009/0287520 | A1 | 11/2009 | Zimmerman |
| 2010/0198736 | A1 | 8/2010 | Marino |
| 2010/0268519 | A1 | 10/2010 | Henning |
| 2011/0040493 | A1 | 2/2011 | Choi |
| 2011/0063116 | A1 | 3/2011 | Lepley |
| 2012/0010917 | A1 | 1/2012 | De Godoi |
| 2013/0246027 | A1 | 9/2013 | Rodriguez |
| 2014/0081579 | A1 | 3/2014 | Tyburski |
| 2015/0185194 | A1 | 7/2015 | Prince |
| 2017/0003684 | A1 | 1/2017 | Knudsen |
| 2017/0097274 | A1 | 4/2017 | Thorpe |
| 2017/0147958 | A1 | 5/2017 | Hatfield |
| 2018/0172544 | A1 | 6/2018 | MacMullin |
| 2018/0266240 | A1 | 9/2018 | Jaaskelainen |
| 2018/0266241 | A1 | 9/2018 | Ferguson |
| 2018/0292374 | A1 | 10/2018 | Dittberner |
| 2019/0033160 | A1 | 1/2019 | Dittberner |
| 2019/0066479 | A1 | 2/2019 | Wesley |
| 2019/0088022 | A1 | 3/2019 | Ochiai |
| 2019/0285504 | A1 | 9/2019 | Muralidhar |
| 2019/0285600 | A1 | 9/2019 | Klein |
| 2019/0366400 | A1 | 12/2019 | Chambers |
| 2019/0386790 | A1 | 12/2019 | Hawinkel |
| 2020/0240259 | A1 | 7/2020 | Balasubramaniam |
| 2020/0320659 | A1 | 10/2020 | Whiting |
| 2020/0371079 | A1 | 11/2020 | Abedini |
| 2022/0008972 | A1 | 1/2022 | Quigley |
| 2022/0065834 | A1 | 3/2022 | Gadot |
| 2023/0126546 | A1 | 4/2023 | Roy |
| 2023/0129412 | A1 | 4/2023 | Roy |
| 2023/0175914 | A1 | 6/2023 | Diven |
| 2023/0176023 | A1 | 6/2023 | Wang |
| 2024/0201314 | A1 | 6/2024 | Gomez-Martinez |

FOREIGN PATENT DOCUMENTS

| | | | | | |
|---|---|---|---|---|---|
| CN | 113705905 | A | * | 11/2021 | G06Q 30/0283 |
| CN | 116071180 | A | * | 5/2023 | G06F 17/10 |
| KR | 20120133989 | A | * | 12/2012 | G06Q 50/10 |
| KR | 20140098312 | A | * | 8/2014 | G06T 13/00 |
| KR | 20150138941 | A | | 12/2015 | |
| KR | 20160008781 | A | | 1/2016 | |
| KR | 20200074648 | A | | 6/2020 | |
| WO | 2016089979 | A1 | | 6/2016 | |
| WO | 2023108041 | A1 | | 6/2023 | |

OTHER PUBLICATIONS

International Search Report and Written Opinion of PCT Application No. PCT/US2021/048981 dated Dec. 23, 2021, 10 pages.

International Search Report and Written Opinion of PCT Application No. PCT/US2021/048977 dated Jun. 3, 2022 9 pages.

International Search Report and Written Opinion of the PCT Application No. PCT/US2022/081142 dated Apr. 25, 2023, 12 pages.

Alvarez, et al. "Assessment of methane emissions from the US oil and gas supply chain." Science 361.6398 (2018): 186-188.

Stockie, John M. "The mathematics of atmospheric dispersion modeling." Siam Review 53.2 (2011): 349-372.

Briggs, G. A. "Optimum formulas for buoyant plume rise." Philosophical Transactions of the Royal Society of London. Series A, Mathematical and Physical Sciences 265.1161 (1969): 197-203.

Hanna et al., Handbook on atmospheric diffusion. No. DOE/TIC-11223. National Oceanic and Atmospheric Administration, Oak Ridge, TN (USA). Atmospheric Turbulence and Diffusion Lab., 1982.

EPA ISC3 method, https://www.epa.gov/scram/air-quality-dispersion-modeling-alternative-models#isc3 (16 pages).

EPA OTM33a method, https://www.epa.gov/emc/emc-other-test-methods#Other%20Test%20Methods (20 pages).

Fugitive Emissions Abatement Simulation Testbed (Feast) software, https://github.com/EAOgroup/FEAST (6 pages).

Seinfeld et al., Atmospheric chemistry and physics: from air pollution to climate change. John Wiley & Sons, 2016, Sections 18.10-18.11, pp. 859-868.

Turner, D. Bruce. Workbook of atmospheric dispersion estimates: an introduction to dispersion modeling. CRC press, 1994, Sections 2.4-2.9, pp. 2-3 to 2-13.

De Visscher, Alex. Air dispersion modeling: foundations and applications. John Wiley & Sons, 2013, sections 6.3-6.5, pp. 145-152.

Ponish, A., et al., 'Some guidelines for genetic algorithm implementation in MINLP batch plant design', Advances in Metaheuristics for Hard Optimization: p. 293., Springer, 2007.

Whitley, D., 'Next generation genetic algorithms: A users guide', Handbook of Metaheuristics, Springer, 2019, p. 245-274.

* cited by examiner

SYSTEMS AND METHODS FOR GREENHOUSE GAS EMISSION QUANTIFICATION AND REDUCTION

CROSS REFERENCE TO RELATED APPLICATION(S)

This application is a National Stage Entry of International Patent Application No. PCT/US2021/048977, filed on Sep. 3, 2021.

BACKGROUND

The present disclosure generally relates to greenhouse gas emissions quantification and reduction and, more particularly, to a gas emission quantification and reduction from upstream and midstream oil and gas facilities.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Methane is a relatively potent greenhouse gas and the main component of natural gas. The process of extracting and processing natural gas inevitably results in some methane emissions, and those emissions lead to global warming, contributing significantly to climate change. As such, operators in upstream/midstream oil and gas are interested in reducing methane emissions from their facilities. Such emissions arise from a range of facilities (e.g., single wells to gas plant), sources (e.g., intentional vents to unintentional fugitive leaks), and equipment (e.g., tanks, compressors, valves, pneumatic controllers, and so forth). Thus, methane emissions can be reduced by a variety of technologies including leak detection, leak repair, venting elimination, and data management. Indeed, numerous, diverse technologies are available to measure and to reduce such emissions, particularly from facilities in the upstream and midstream industries. However, there is a need for provision of turnkey services to measure and reduce a customer's greenhouse gas emissions in a cohesive manner (e.g., from a single provider).

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method that includes providing one or more recommendations relating to greenhouse gas emission reduction goals to a customer. The method also includes receiving one or more greenhouse gas emission reduction goals from the customer. The one or more greenhouse gas emission reduction goals relate to a reduction in greenhouse gas emissions at one or more oil and gas worksites associated with the customer. The method also includes determining a greenhouse gas emission reduction plan to reduce the greenhouse gas emissions at the one or more oil and gas worksites to achieve the one or more greenhouse gas emission reduction goals. The method further includes performing work to implement the greenhouse gas emission reduction plan. The method also includes collecting and analyzing greenhouse gas emission measurements to ensure that the one or more greenhouse gas emission reduction goals have been achieved by the greenhouse gas emission reduction plan.

Certain embodiments of the present disclosure also include a greenhouse gas emission quantification and reduction system having one or more processors configured to execute computer-executable instructions, wherein the computer-executable instructions, when executed by the one or more processors, cause the one or more processors to provide one or more recommendations relating to greenhouse gas emission reduction goals to a customer; receive one or more greenhouse gas emission reduction goals provided by the customer, wherein the one or more greenhouse gas emission reduction goals relate to a reduction in greenhouse gas emissions at one or more oil and gas worksites associated with the customer; to determine a greenhouse gas emission reduction plan to reduce the greenhouse gas emissions at the one or more oil and gas worksites to achieve the one or more greenhouse gas emission reduction goals; to receive information relating to work performed by one or more provider employees to implement the gas emission reduction plan; and to collect and analyze greenhouse gas emission measurements to ensure that the one or more greenhouse gas emission reduction goals have been achieved by the greenhouse gas emission reduction plan.

Certain embodiments of the present disclosure also include a computer-enabled method that includes providing one or more recommendations relating to greenhouse gas emission reduction goals to a customer. The computer-enabled method also includes receiving one or more greenhouse gas emission reduction goals provided by the customer. The one or more greenhouse gas emission reduction goals relate to a reduction in greenhouse gas emissions at one or more oil and gas worksites associated with the customer. The computer-enabled method also includes determining a greenhouse gas emission reduction plan to reduce the greenhouse gas emissions at the one or more oil and gas worksites to achieve the one or more greenhouse gas emission reduction goals. The computer-enabled method further includes receiving information relating to work performed by one or more provider employees to implement the greenhouse gas emission reduction plan. The computer-enabled method also includes collecting and analyzing greenhouse gas emission measurements to ensure that the one or more greenhouse gas emission reduction goals have been achieved by the greenhouse gas emission reduction plan.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which.

DETAILED DESCRIPTION

Figure 1:
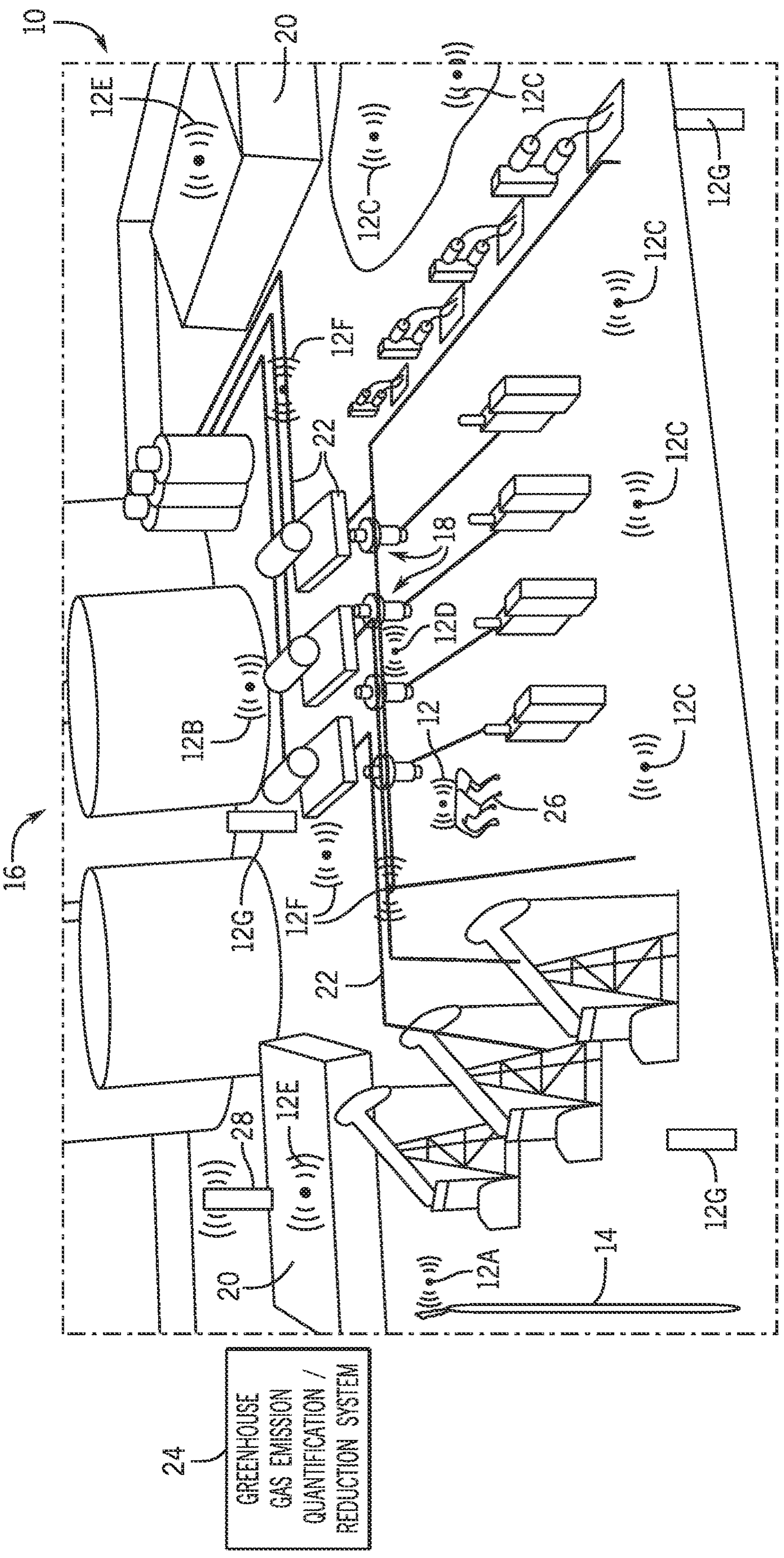
FIG. 1 illustrates an example oil and gas worksite that may include a plurality of sensors that may be used to monitor greenhouse gas emissions and/or gas emissions relating to flaring operations at an oil and gas worksite, in accordance with embodiments of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to described operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "automatic" and "automated" are intended to describe operations that are performed are caused to be performed, for example, by a greenhouse gas emission analysis system (i.e., solely by the greenhouse gas emission analysis system, without human intervention).

Numerous discrete technologies may be used to reduce methane emissions from upstream/midstream oil and gas facilities, including vapor recovery units to capture gas emitted from storage tanks, instrument air units to operate pneumatics, and various sensors (e.g., handheld sniffers and cameras, continuous monitors, mobile monitors) to identify fugitive emissions. Digital tools may also be used to compare the cost-effectiveness of different technologies and to manage the resulting data. However, heretofore, there is no integration of these activities by single providers. For example, customers typically decide whether they want to reduce their emissions by installing vapor recovery units or looking for leaks with satellites or of myriad other approaches to reduce emissions. If, for example, the customers choose to use a satellite to locate leaks, they use one provider for the satellite measurements to tell them which well pad is leaking, another provider to identify which particular component on the facility is responsible for the leak, and a third provider to repair the leak.

An aspect of the present disclosure is to enable a turnkey greenhouse gas emissions reduction and quantification service. In particular, this integrated, end-to-end service includes all activities required to measure emissions rates and to reduce these rates to a customer-defined target in the most efficient manner possible. In addition, in certain embodiments, this end-to-end service includes reducing emissions rates relating to flaring to a customer-defined target in the most efficient manner possible. In general, this service includes four key components: job planning, leak detection and repair, venting mitigation, and data management. The embodiments described herein enable a provider to measure and reduce greenhouse gas emissions and/or gas emissions relating to flaring operations, the provider identifying the most cost-effective way to meet a customer's emission reduction targets, and performing the physical and digital work required to reduce the emissions, and then measuring and quantifying the resulting emissions.

FIG. 1 illustrates an example oil and gas worksite 10 that may include a plurality of sensors 12 that may be used to monitor greenhouse gas emissions and/or gas emissions relating to flaring operations at the oil and gas worksite 10. For example, as illustrated in FIG. 1, in certain embodiments, the sensors 12 may include flare monitors 12A, tank sensors 12B, gas concentration monitors 12C, compressor health monitors 12D, structural monitors 12E, process monitors 12F, and/or meteorological sensors 12G. However, in other embodiments, the sensors 12 may include other types of sensors capable of providing data relating to greenhouse gas emissions and/or gas emissions relating to flaring operations. Furthermore, other types of data may be used to monitor greenhouse gas emissions and/or gas emissions relating to flaring operations at the oil and gas worksite 10 such as the time of day when the detection occurred and the sunrise/sunset time on that day, among other information.

In certain embodiments, one or more flare monitors 12A may be used to monitor flaring of one or more flares 14 at the oil and gas worksite 10 in order to prevent methane emissions by combusting methane into carbon dioxide. In certain embodiments, the one or more flare monitors 12A may be installed on, or in close proximity to (e.g., within a few feet of), the one or more flares 14. Substantial methane emissions may occur if flares 14 are unlit or burn inefficiently. The flares 14 may be monitored by many various types of flare monitors 12A. For example, in certain embodiments, the flare monitors 12A may include one or more cameras, which may detect the absence of a flame from a particular flare 14, indicating that the particular flare 14 is unlit. In certain embodiments, the one or more cameras may detect the presence of black smoke emanating from a particular flare 14, indicating inefficient combustion via the particular flare 14. In addition, in certain embodiments, the flare monitors 12A may include one or more thermocouples or other temperature sensors, which may detect temperatures relating to a particular flare 14, indicating that the particular flare 14 is unlit or combusting inefficiently. In addition, in certain embodiments, the flare monitors 12A may include one or more light sensors configured to detect light proximate to a particular flare 14. In addition, in certain embodiments, the flare monitors 12A may include one or more carbon dioxide sensors to detect carbon dioxide concentrations in the vicinity around a particular flare 14. Low carbon dioxide concentrations in the vicinity of the particular flare 14 may indicate that the particular flare 14 is unlit or combusting inefficiently. In addition, in certain embodiments, the flare monitors 12A may include one or more flow sensors to detect a flow of gas into a particular flare 14. Low flow into the particular flare 14 may indicate that the particular flare 14 is not destroying as much methane as usual. Any of this non-limiting list of conditions relating to operation of flares 14 may be correlated with other data described herein to indicate that unintentional greenhouse gas emissions may be occurring relating to the flares 14.

In certain embodiments, one or more tank sensors 12B may be used to monitor operational statuses of one or more storage tanks 16 (e.g., oil or water storage tanks) at the oil and gas worksite 10. In certain embodiments, the one or more tank sensors 12B may be installed on, or in close proximity to (e.g., within a few feet of), the one or more storage tanks 16. Oil or water storage tanks are also a common source of methane emissions. These emissions can occur, for example, when a thief hatch on a storage tank 16 is left open or when a pressure relief valve of the storage tank 16 is opening too frequently. As such, in certain embodiments, the tank sensors 12B may detect whether certain hatches of certain storage tanks 16 are opened or closed, whether (and how often) certain valves of certain storage tanks 16 are opened or closed, as well as other operational statuses of the storage tanks 16. In certain embodiments, the tank sensors 12B may include one or more contact sensors to detect when certain hatches of certain storage tanks 16 are opened or closed. In addition, in certain embodiments, the tank sensors 12B may include one or more cameras to detect when certain hatches of certain storage tanks 16 are opened or closed. In addition, in certain embodiments, the tank sensors 12B may include one or more tank pressure gauges and/or level gauges to detect tank pressures within certain storage tanks 16 and/or tank levels (e.g., of water or gas stored in certain storage tanks 16), which may indicate whether a pressure relief valve is operating appropriately. Any of this non-limiting list of conditions relating to operation of storage tanks 16 may be correlated with other data described herein to indicate that unintentional greenhouse gas emissions may be occurring relating to the storage tanks 16.

In certain embodiments, one or more gas concentration monitors 12C may be used to directly monitor gas concentrations at certain locations within the oil and gas worksite 10. In certain embodiments, the gas concentration monitors 12C may be used without other sensors to monitor for emissions. However, as described in greater detail herein, in other embodiments, the other sensors 12 described herein may be used to supplement the gas concentration readings detected by the gas concentration monitors 12C. While the gas concentration monitors 12C can in theory be used to identify any source of methane emissions, in practice, there may be some constraints that need to be considered. For example, emissions from storage tanks 16 often occur from elevated locations, so a gas concentration monitor 12C should also be elevated to maximize sensitivity. However, there is often little room, particularly outside a hazardous zone, to mount a gas concentration monitor 12C. Similarly, gas concentration monitors 12C should, ideally, be located relatively far away from flares 14 to avoid being damaged by the heat from the flares 14; however, the sensitivity of methane concertation monitors 12C decreases at greater distances. In certain embodiments, the gas concentration monitors 12C may be primarily used to monitor for gas emissions from sources other than flares 14 or storage tanks 16. In certain embodiments, the gas concertation monitors 12C may include photoacoustic sensors, metal oxide sensors, catalytic sensors, solid state sensors, infrared spectrometers, molecular property spectrometers (MPSs), microelectromechanical systems (MEMS) sensors, interband cascade light emitting devices, or any other sensors configured to directly detect gas concentrations. Depending on the sensor type, the gas concentration monitors 12C may convert a measured variable to an electrical signal using chemical, physical, or other processes.

In certain embodiments, one or more compressor health monitors 12D may be used to monitor certain operational statuses of one or more compressors 18 at the oil and gas worksite 10. In certain embodiments, the compressor health monitors 12D may be installed on, or in close proximity to (e.g., within a few feet of), the one or more compressors 18. By determining the operational statuses of certain compressors 18, the compressor health monitors 12D may provide additional information as to whether valves, seals, motors, or other equipment associated with the compressors 18 are near failure. If a problem is detected at the same time as elevated greenhouse gas concentrations, there is an increased likelihood of a gas leak occurring. Although described herein as being compressor health monitors 12D configured to detect operational statuses of compressors 18, in other embodiments, pump health monitors configured to detect operational statuses of pumps at the oil and gas worksite 10 may also be used. Any of this non-limiting list of conditions relating to operational statuses of compressors 18 (or pumps) may be correlated with other data described herein to indicate that unintentional greenhouse gas emissions may be occurring relating to the compressors 18 (or pumps).

In certain embodiments, one or more structural monitors 12E may be used to monitor one or more structures 20 at the oil and gas worksite 10, for example, as they evolve over time. In certain embodiments, the structural monitors 12E may be installed on, or in close proximity to (e.g., within a few feet of), the one or more structures 20. For example, in certain embodiments, the structural monitors 12E may include light detection and ranging (LIDAR) devices and/or cameras (e.g., either infrared or visible light cameras) configured to collect three-dimensional (3D) scanning and images and/or video of the oil and gas worksite 10, the data relating to which may be used to generate 3D reconstructions of structures 20 at the oil and gas worksite 10, as well as other equipment at the oil and gas worksite 10 and other physical features of the oil and gas worksite 10 that can be reconstructed in a 3D model. In certain embodiments, by comparing the locations at which elevated gas concentrations are measured to locations of different structures 20, a better prediction as to the location of a possible gas leak may be generated.

In certain embodiments, one or more process monitors 12F may be used to monitor certain processes carried out by certain processing equipment 22 (e.g., valves, pipes, heat exchangers, manifolds, mixing chambers, and so forth) of the oil and gas worksite 10. For example, the infrastructure of the oil and gas worksite 10 may include process monitors 12F configured to measure operational parameters, such as valve positions, flow rates of fluids (e.g., oil and gas), and other common operational parameters relating to certain processes that occur at the oil and gas worksite 10. When combined with knowledge of the process architecture, this information may be used to determine whether greenhouse gas is expected to be released due to a current configuration of the processes. In certain embodiments, the process monitors 12F may already exist at the oil and gas worksite 10 or could be added for both understanding day-to-day operations as well as enhancing gas leak detection, as described in greater detail herein.

In certain embodiments, one or more meteorological sensors 12G may be used to collect certain meteorological data relating to the oil and gas worksite 10. For example, in certain embodiments, anemometers measuring wind direction, speed, and stability class may be used to infer the dispersion of a gas plume and, thus, more precisely infer a greenhouse gas emission location. In addition, in certain embodiments, other types of meteorological data may be collected by the meteorological sensors 12G including, but not limited to, solar radiation, precipitation, temperature, and humidity, all of which may play a role in the methane plume behavior, as well as the sensor calibration. At a minimum, using such meteorological sensors 12G may enable determining whether a greenhouse gas emission is occurring within the oil and gas worksite 10 or from a disturbance outside of the oil and gas worksite 10 (e.g., from natural decay sources or external equipment such as vehicles).

Although described primarily herein as pertaining to oil and gas worksites 10, the term "oil and gas worksite" is intended to include any worksites 10 wherein oil and/or gas is processed in any manner, and from which fugitive gas emissions may occur. Indeed, the embodiments described herein include systems and methods for identifying fugitive gas emissions from any types of worksites 10 including, but not limited to, emissions of natural gas from well pad equipment or any point in delivery of gas to a point of use. In addition, the embodiments described herein may be applied to other types of gases or fluids emitted from other types of worksites 10. In general, the embodiments described herein include placing one or more sensors 12 described above around an oil and gas worksite 10 as illustrated in FIG. 1. Collectively, the sensors 12 provide continuous measurement of fugitive and vented greenhouse gas emissions and/or gas emissions relating to flaring operations with respect to the oil and gas worksite 10. In certain embodiments, gas concertation data, along with wind data, may be interpreted using an algorithm to determine when an emission occurred, where it occurred, and how large it was (e.g., in terms of units of flow). Optionally, in certain embodiments, machine learning techniques may be used to determine why the emissions occurred.

The embodiments described herein implement a variety of methods for detecting fugitive gas emissions. For example, in some situations, point sensors based on flame ionization detector, metal oxide, or catalytic technology may be used. These sensors may be placed next to (e.g., typically within 1 foot of) potential gas leak sources and measure a local concentration of greenhouse gases and/or gas emissions relating to flaring operations. If the concentration exceeds a threshold (e.g., such as 100 ppm above background), the equipment being tested is considered to have a gas leak. This method is typically effective but is relatively inefficient and expensive. In other situations, LIDAR devices and/or cameras (e.g., infrared cameras, visible light cameras, and so forth) may be used to survey a relatively large area for gas leaks. This method can be efficient, but the sensitivity is relatively poor and dependent on external conditions. In addition, the gas measurement is often qualitative by comparison. In other situations, sensors may be mounted to mobile platforms such as unmanned aerial vehicles, mobile robots, and so forth. This method can be relatively effective, but can provide intermittent inspection, meaning it can be relatively inaccurate for detecting transient greenhouse gas emission events. In other situations, other permanent solutions can be deployed on location, solving the problem of transient greenhouse gas leaks. Such systems may include technologies such as multipass infrared spectroscopy and metal oxide sensors. Those sensors can be relatively effective but suffer from relatively high costs, relatively short lifetimes, and relatively high-power consumption.

The embodiments described herein combine the best aspects of these methods while minimizing the drawbacks. In particular, in order to improve the performance of systems deployed to identify greenhouse gas emissions and/or gas emissions relating to flaring operations from upstream and midstream facilities, the embodiments described herein use multiple different types of sensors 12, operated together to identify and classify methane emissions. In certain embodiments, multiple technologies may be used at the same oil and gas worksite 10, and different technologies (or different combinations of technologies) may be used on different oil and gas worksites 10. As each sensor type provides complementary information, the combination of data from all sensors 12 can significantly improve the performance of the overall system by increasing sensitivity, reducing false positives (e.g., gas vents misclassified as gas leaks) and negatives (e.g., gas leaks misclassified as gas vents), and allowing for better identification of the equipment producing the gas emissions. As described above, there are several different classes of sensors 12 that can be used together in this purpose. For example, in certain embodiments, at least one sensor 12 that is being used (e.g., the flare monitors 12A, the tank sensors 12B, the compressor health monitors 12D, the structural monitors 12E, the process monitors 12F, and so forth) may be configured to detect a status of equipment at the oil and gas worksites 10, as opposed to directly detecting gas emissions (e.g., the gas concentration monitors 12C).

The goal of the sensing is to use a greenhouse gas emission quantification and reduction system 24 to quantify greenhouse gas emissions and/or gas emissions relating to flaring operations at an oil and gas worksite 10, to track trends in the greenhouse gas emissions and/or gas emissions relating to flaring operations at the oil and gas worksite 10 over time, and to facilitate the reduction of the greenhouse gas emissions and/or gas emissions relating to flaring operations at the oil and gas worksite 10, among other functions, as described in greater detail herein. The procedure involves deploying one or more sensors 12 at one or more oil and gas worksites 10 and providing data collected by the sensors 12 to the greenhouse gas emission quantification and reduction system 24 for tracking. For example, in certain embodiments, flare monitors 12A and tank sensors 12B may be used to measure emissions from flares 14 and storage tanks 16, respectively, which are relatively difficult to cover with gas concertation sensors 12C. As such, the flare monitors 12A and tank sensors 12B (as well as the compressor health monitors 12D, the structural monitors 12E, the process monitors 12F, and so forth) detect statuses of equipment at the one or more oil and gas worksites 10 to indirectly infer gas emissions at the one or more oil and gas worksites 10, whereas the gas concertation sensors 12C directly detect gas emissions at the one or more oil and gas worksites 10. In certain embodiments, one or more (or, in some applications, fewer) gas concentration sensors 12C may directly detect gas emissions from sources other than flares 14 and storage tanks 16. The flare, tank, and other concertation measurements, along with wind measurements in certain embodiments, may be used as inputs into one or more algorithms executed by the greenhouse gas emission quantification and reduction system 24, which may output the timing, location, and magnitude of any detected greenhouse gas emissions, as described in greater detail herein. In certain embodiments, the algorithms may include Gaussian plume models, Lagrangian dispersion models, reverse dispersion models, computational fluid dynamics simulations, or other inversion models. Optionally, in certain embodiments, patterns in the time series of greenhouse gas emission rate or between greenhouse gas emission rates and equipment characteristics may be used by the greenhouse gas emission quantification and reduction system 24 to determine if the emissions were intended (i.e., vent) or unintended (i.e., fugitive). In certain embodiments, this determination may involve methods in data science such as machine learning and artificial intelligence.

When a greenhouse gas emission has been detected and characterized by the greenhouse gas emission quantification and reduction system 24 using this approach, the equipment allowing the emissions may be repaired. Furthermore, in certain embodiments, when certain patterns describing greenhouse gas emissions are discovered by the greenhouse gas emission quantification and reduction system 24, future emissions may be preemptively prevented by the greenhouse gas emission quantification and reduction system 24 by automatically applying these patterns to future sensor detections.

As will be appreciated, there are several different workflows (e.g., including several different combinations of different sensors 12) that can be used and considered for analysis by the greenhouse gas emission quantification and reduction system 24. In addition, as illustrated in FIG. 1, in certain embodiments, one or more of the sensors 12 described herein may be mounted to a mobile platform 26, for example, an unmanned aerial vehicle (e.g., a drone), a mobile robot (e.g., a Spot robot), or any other relatively agile mobile platform configured to move about an oil and gas worksite 10, carrying one or more sensors 12 that can detect relevant data relating to greenhouse gas emissions and/or gas emissions relating to flaring operations that may be occurring at the oil and gas worksite 10, as described in greater detail herein. In one non-limiting example, if a LIDAR and/or visible camera (e.g., as a structural monitor 12E) is mounted to a mobile platform 26 moving about the oil and gas worksite 10, both a 3D reconstruction of the infrastructure of the oil and gas worksite 10 and a corresponding 3D visualization of a gas plume for a possible gas leak may be generated by the greenhouse gas emission quantification and reduction system 24. This information thus allows clear determination by the gas emission quantification and reduction system 24 of where the gas leak source is and confirmation that it is coming from the oil and gas worksite 10 itself.

Another example workflow that may be implemented by the greenhouse gas emission quantification and reduction system 24 is to correlate gas concentration time series (e.g., as collected by the gas concentration monitors 12C) together with events detected by other monitors like tank sensors 12B or compressor health monitors 12D. If elevated gas concentration readings occur at the same time as another sensor 12 detecting that there is some operational change (e.g., a thief hatch of a storage tank 16 being opened), then the greenhouse gas emission quantification and reduction system 24 may infer that it is likely that a gas leak is occurring where the operational change is occurring. In certain embodiments, this analysis by the greenhouse gas emission quantification and reduction system 24 may be enhanced using standard sensor fusion techniques such as Kalman filtering, particle filtering, Bayesian inference, and so forth. Additionally, in certain embodiments, this information may be correlated by the greenhouse gas emission quantification and reduction system 24 with information such as planned maintenance operations and data from standard process instrumentation sensors (e.g., the process monitors 12F) to determine whether a specific release is accidental or a controlled release that is expected.

As described in greater detail herein, in certain embodiments, the greenhouse gas emission quantification and reduction system 24 may interpret data received from an array of distributed discrete gas concentration monitors 12C (e.g., configured to detect concentrations of methane, volatile organic compounds (VOCs), carbon dioxide ($CO_2$), and so forth) as well as other sensors 12 located around an oil and gas worksite 10 for the purpose of quantifying greenhouse gas emissions and/or gas emissions relating to flaring operations at the oil and gas worksite 10, tracking trends in the greenhouse gas emissions and/or gas emissions relating to flaring operations at the oil and gas worksite 10 over time, and facilitating the reduction of the greenhouse gas emissions and/or gas emissions relating to flaring operations at the oil and gas worksite 10. As such, the embodiments described herein enable the determination of the amount of greenhouse gas emissions and/or gas emissions relating to flaring operations from facilities in terms of cost and environmental footprint. Since the sensors 12 may be permanently (or, at least, semi-permanently) located within the oil and gas worksite 10 and connected to the cloud, operators of the oil and gas worksite 10 may have access in substantially real time to emission information without having to involve any human intervention (e.g., thereby resulting in less health and safety exposure).

As illustrated in FIG. 1, in certain embodiments, some or all of the sensors 12 may be configured to communicate wirelessly to the greenhouse gas emission quantification and reduction system 24 for the purpose of communicating the data collected by the sensors 12 for analysis by the greenhouse gas emission quantification and reduction system 24, as described in greater detail herein. In addition, as also illustrated, in certain embodiments, one or more communications gateways 28 may be located around the oil and gas worksite 10 and may be used to facilitate communication between the sensors 12 and the greenhouse gas emission quantification and reduction system 24 by, for example, relaying data to the greenhouse gas emission quantification and reduction system 24 from the sensors 12. For example, in certain embodiments, the greenhouse gas emission quantification and reduction system 24 may be implemented as an edge device that is part of a cloud-based computing environment, and the gateway 28 may facilitate communication of sensor data from the sensors 12 to the greenhouse gas emission quantification and reduction system 24 via the cloud.

As described in greater detail herein, the greenhouse gas emission quantification and reduction system 24 is configured to detect the existence of a gas emission within the oil and gas worksite 10, to quantify greenhouse gas emissions and/or gas emissions relating to flaring operations at the oil and gas worksite 10, to track trends in the greenhouse gas emissions and/or gas emissions relating to flaring operations at the oil and gas worksite 10 over time, and to facilitate the reduction of the greenhouse gas emissions and/or gas emissions relating to flaring operations at the oil and gas worksite 10. In addition, in certain embodiments, in response to detecting a particular gas emission, the greenhouse gas emission quantification and reduction system 24 may automatically send one or more control signals to one or more pieces of equipment (e.g., the flares 14, the storage tanks 16, the compressors 18 (or pumps), the processing equipment 22, the mobile platforms 26, and so forth) of the oil and gas worksite 10 such that one or more operational parameters of the one or more pieces of equipment may be automatically adjusted to minimize (e.g., mitigate) the effects of the detected gas emission. For example, if the greenhouse gas emission quantification and reduction system 24 determines that a gas emission is likely due to a particular valve opening too much, the greenhouse gas emission quantification and reduction system 24 may automatically send a control signal to the particular valve to cause the particular valve to close.

Figure 2:
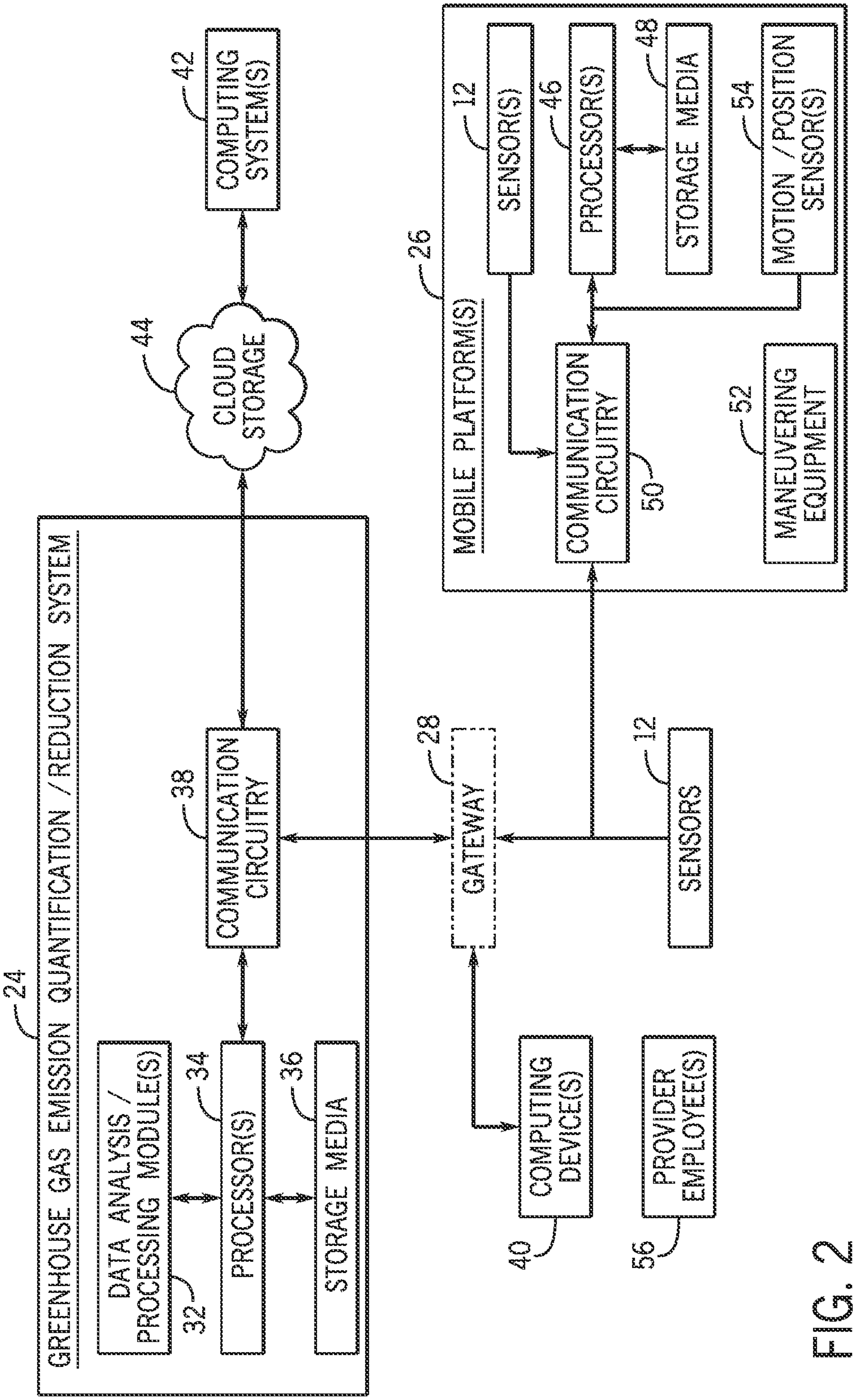
FIG. 2 illustrates a greenhouse gas emission quantification and reduction system that includes one or more data analysis and processing modules configured to facilitate various greenhouse gas emission quantification and reduction functions, in accordance with embodiments of the present disclosure.

As illustrated in FIG. 2, in certain embodiments, the greenhouse gas emission quantification and reduction system 24 described herein may include one or more data analysis and processing modules 32 (e.g., programs of computer-executable instructions and associated data) that may be configured to facilitate various greenhouse gas emission quantification and reduction functions of the embodiments described herein. In certain embodiments, to perform these various functions, a data analysis and processing module 32 executes on one or more processors 34 of the greenhouse gas emission quantification and reduction system 24, which may be connected to one or more storage media 36 of the greenhouse gas emission quantification and reduction system 24. Indeed, in certain embodiments, the one or more data analysis and processing modules 32 may be stored in the one or more storage media 36 of the greenhouse gas emission quantification and reduction system 24.

In certain embodiments, the one or more processors 34 of the greenhouse gas emission quantification and reduction system 24 may include a microprocessor, a microcontroller, a processor module or subsystem, a programmable integrated circuit, a programmable gate array, a digital signal processor (DSP), or another control or computing device. Alternatively or additionally, the one or more processors 34 of the greenhouse gas emission quantification and reduction system 24 may include discrete electronic components coupled to a printed circuit board, integrated circuitry (e.g., Application Specific Integrated Circuits (ASIC)), and/or programmable logic devices (e.g., a Field Programmable Gate Arrays (FPGA)).

In certain embodiments, the one or more data analysis and processing modules 32 may be implemented as computer program logic for use with the one or more processors 34 of the greenhouse gas emission quantification and reduction system 24. The computer program logic may be embodied in various forms, including a source code form or a computer executable form. Source code may include a series of computer program instructions in a variety of programming languages (e.g., an object code, an assembly language, or a high-level language such as C, C++, or JAVA). The computer instructions may be distributed in any form as a removable storage medium with accompanying printed or electronic documentation (e.g., shrink wrapped software), preloaded on the greenhouse gas emission quantification and reduction system 24 (e.g., on system ROM or fixed disk), or distributed from a server or electronic bulletin board over a communication system (e.g., the Internet or World Wide Web). In addition, in certain embodiments, the greenhouse gas emission quantification and reduction system 24 may be implemented as an edge device that is part of a cloud-based computing environment, and the computer program logic may be executed by the edge device in the cloud-based computing environment.

In certain embodiments, the one or more storage media 36 of the greenhouse gas emission quantification and reduction system 24 may be implemented as one or more non-transitory computer-readable or machine-readable storage media. In certain embodiments, the one or more storage media 36 of the greenhouse gas emission quantification and reduction system 24 may include one or more different forms of memory including semiconductor memory devices such as dynamic or static random access memories (DRAMs or SRAMs), programmable read-only memories (PROMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); PC cards (e.g., PCMCIA cards), or other types of storage devices.

As described above, in certain embodiments, the computer-executable instructions and associated data of the data analysis and processing module(s) 32 may be provided on one computer-readable or machine-readable storage medium of the storage media 36 of the greenhouse gas emission quantification and reduction system 24, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 36 of the greenhouse gas emission quantification and reduction system 24 may be located either in the machine running the machine-readable instructions, or may be located at a remote site from which machine-readable instructions may be downloaded over a network for execution. Indeed, in certain embodiments, the greenhouse gas emission quantification and reduction system 24 may be implemented as an edge device that is part of a cloud-based computing environment, and the machine-readable instructions may be executed by the edge device in the cloud-based computing environment.

In certain embodiments, the processor(s) 34 of the greenhouse gas emission quantification and reduction system 24 may be connected to communication circuitry 38 of the gas emission quantification and reduction system 24 to allow the greenhouse gas emission quantification and reduction system 24 to communicate with the various sensors 12, the mobile platforms 26, equipment located at the oil and gas worksite 10, one or more computing devices 40 (e.g., smart phones, tablets, laptop computers, desktop computers, and other types of computing devices), and/or one or more external computing systems 42 for the purpose of automatically detecting the existence of a gas emission within the oil and gas worksite 10, quantifying greenhouse gas emissions and/or gas emissions relating to flaring operations at the oil and gas worksite 10, tracking trends in the greenhouse gas emissions and/or gas emissions relating to flaring operations at the oil and gas worksite 10 over time, and facilitating the reduction of the greenhouse gas emissions and/or gas emissions relating to flaring operations at the oil and gas worksite 10, as described in greater detail herein. In certain embodiments, the communication circuitry 38 of the greenhouse gas emission quantification and reduction system 24 may also facilitate the greenhouse gas emission quantification and reduction system 24 communicating data to cloud storage 44 (or other wired and/or wireless communication network) to, for example, archive the data or to enable external computing systems 42 to access the data and/or to remotely interact with the greenhouse gas emission quantification and reduction system 24.

Regardless of the destination for the communication, in certain embodiments, the processor(s) 34 and/or the communication circuitry 38 may be configured to automatically convert the data that is communicated into a data format suitable for transmission to and use by the particular destination to which the data is transmitted. For example, in certain embodiments, certain types of sensors 12, mobile platforms 26, and/or equipment located at one or more oil and gas worksites 10 may only be capable of receiving and acting upon data in particular data formats. As such, in such scenarios, the processor(s) 34 and/or the communication circuitry 38 may automatically convert data to be transmitted to such sensors 12, mobile platforms 26, and/or equipment into the particular data formats before transmitting the data to the sensors 12, mobile platforms 26, and/or equipment. In addition, in certain embodiments, the processor(s) 34 may be configured to automatically transmit command signals to the computing devices 40 to, for example, launch and application running on the computing devices 40 to notify a provider employee of certain updates relating to quantification and reduction of greenhouse gas emissions at one or more oil and gas worksites 10 as they occur in substantially real time. Such automated data conversion and transmission enables the greenhouse gas emission quantification and reduction system 24 to more effectively communicate data to provider employees.

In certain embodiments, the communication circuitry 38 of the greenhouse gas emission quantification and reduction system 24 may be, include, or be implemented by various types of standard interfaces, such as an Ethernet interface, a universal serial bus (USB), a third generation input/output (3GIO) interface, a wireless interface, a cellular interface, and/or a satellite interface, among others. In certain embodiments, the communication circuitry 38 of the greenhouse gas emission quantification and reduction system 24 may also include a communication device, such as a modem or network interface card to facilitate exchange of data with external computing devices via a network (e.g., Ethernet connection, digital subscriber line (DSL), telephone line, coaxial cable, cellular telephone system, satellite, etc.).

In addition, as also illustrated in FIG. 2, in certain embodiments, the one or more mobile platforms 26, which each may have one or more sensors 12 attached to it, may also include one or more processors 46 (e.g., similar to the processors 34 of the greenhouse gas emission quantification and reduction system 24) configured to run computer program logic, which may be embodied in various forms (e.g., similar to the data analysis and processing modules 32 of the greenhouse gas emission quantification and reduction system 24) and may be stored in storage media 48 of the respective mobile platform 26 (e.g., which may be similar to the storage media 36 of the greenhouse gas emission quantification and reduction system 24) to automatically (e.g., autonomously) control maneuvering of the respective mobile platform 26 around the oil and gas worksite 10 for the purpose of repositioning its respective sensors 12 such that the sensors 12 can detect data relating to potential gas leaks at the oil and gas worksite 10.

In certain embodiments, the processor(s) 46 of the mobile platform(s) 26 may be connected to communication circuitry 50 of the respective mobile platform 26 (e.g., which may be similar to the communication circuitry 38 of the greenhouse gas emission quantification and reduction system 24) to allow the respective mobile platform 26 to communicate with the greenhouse gas emission quantification and reduction system 24, the various sensors 12, other mobile platforms 26, equipment located at the oil and gas worksite 10, the computing devices 40, and/or external computing systems 42 for the purpose of determining how to automatically (e.g., autonomously) maneuver itself around the oil and gas worksite 10 to enable its respective sensors 12 to detect data relating to potential gas leaks at the oil and gas worksite 10. In certain embodiments, the communication circuitry 50 of the mobile platform(s) 26 may also facilitate the of the respective mobile platform 26 to communicate data to the cloud storage 44 (or other wired and/or wireless communication network) to, for example, archive the data or to enable external computing systems 42 to access the data and/or to remotely interact with the respective mobile platform 26.

In certain embodiments, the processor(s) 46 of the mobile platform(s) 26 may execute computer program logic to determine how to automatically (e.g., autonomously) control maneuvering equipment 52 of the respective mobile platform 26 to enable the maneuvering equipment 52 to maneuver the respective mobile platform 26 around the oil and gas worksite 10 for the purpose of repositioning its respective sensors 12 such that the sensors 12 can detect data relating to potential gas leaks at the oil and gas worksite 10. For example, in certain embodiments, a mobile platform 26 may be an unmanned aerial vehicle (e.g., a drone) and the maneuvering equipment 52 may include propellers, motors configured to rotate the propellers at specific speeds, and so forth, configured to enable the unmanned aerial vehicle to maneuver the mobile platform 26 aerially about the oil and gas worksite 10. However, in other embodiments, a mobile platform 26 may be a mobile robot and the maneuvering equipment 52 may include robotic legs, wheels, and so forth, configured to maneuver the mobile platform 26 over the ground and certain structures 20 and/or equipment of the oil and gas worksite 10.

In certain embodiments, the processor(s) 46 of the mobile platform(s) 26 may execute computer program logic to determine how to automatically (e.g., autonomously) control maneuvering equipment 52 of the respective mobile platform 26 based at least in part on one or more motion/position sensors 54 of the respective mobile platform 26. As used herein, the term "motion/position sensor" may refer not only to a sensor configured to detection motion and/or a position, such as accelerometers, gyroscopes, and so forth, but also any and all other types of sensors, such as LIDAR devices and/or cameras, global positioning systems (GPS), and so forth, which may provide feedback data that may be used to determine motion and/or a position of a respective mobile platform 26 relative to the oil and gas worksite 10. In certain embodiments, the greenhouse gas emission quantification and reduction system 24 may be configured to automatically send control signals to the mobile platform(s) 26 to at least partially control the maneuvering of a particular mobile platform 26 when, for example, the greenhouse gas emission quantification and reduction system 24 determines that certain data relating to a potential gas leak may be useful, and that a particular sensor 12 attached to the particular mobile platform 26 may be capable of collecting such data of interest.

Returning to FIG. 1, in certain embodiments, certain sensors 12 may be installed either next to specific equipment of interest (e.g., such as storage tanks 16, compressors 18, processing equipment 22, and so forth) disposed about an oil and gas worksite 10 in order to detect external gas leaks specifically occurring in the vicinity of this equipment of interest. Alternatively or additionally, certain sensors 12 may be distributed across an oil and gas worksite 10 as an array of sensors. In other words, such distributed sensors 12 may not be located next to specific equipment of interest, but rather may be disposed at various locations spaced about the oil and gas worksite 10 such that triangulation between the sensors 12 may be performed, as described in greater detail herein. Indeed, as described in greater detail herein, in certain embodiments, certain sensors 12 may be attached to mobile platforms 26 that are configured to maneuver the sensors 12 about the oil and gas worksite 10 such that the sensors 12 can collect data from almost any location within the oil and gas worksite 10. Regardless of the specific location (e.g., either fixed or transient) of any given sensor 12 at any given time, each of the sensors 12 may be configured to communicate not only the specific sensor data collected by the respective sensor 12 but also location data for the respective sensor 12 to the greenhouse gas emission quantification and reduction system 24 for analysis, as described in greater detail herein.

Figure 3:
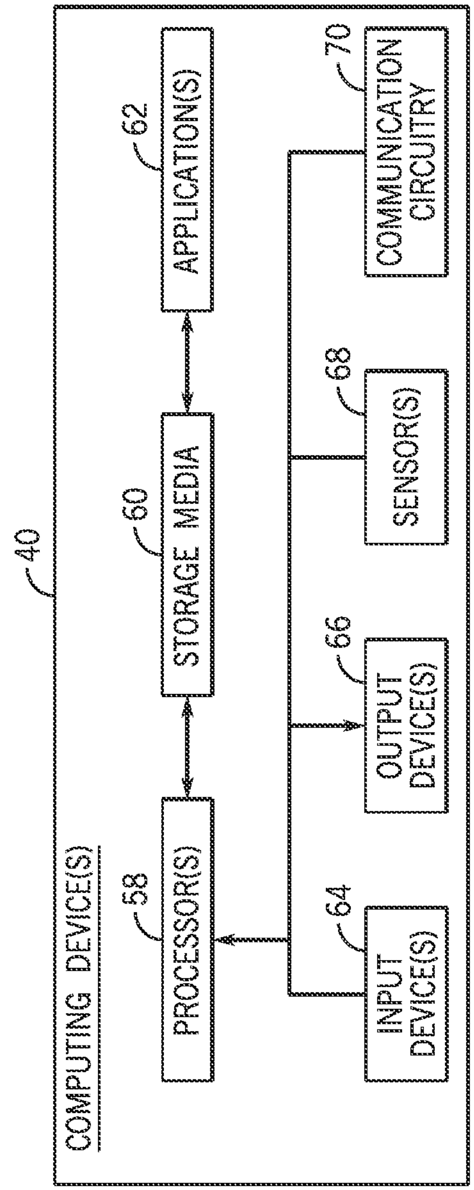
FIG. 3 illustrates various components of computing devices, which facilitate provider employees interacting with the greenhouse gas emission quantification and reduction system of FIG. 2, in accordance with embodiments of the present disclosure.

In general, the greenhouse gas emission quantification and reduction system 24 enables one or more provider employees 56 to interact with one or more computing devices 40 (and/or one or more external computing systems 42) to use the gas emission-related data that is collected, analyzed, and interpreted by the greenhouse gas emission quantification and reduction system 24, as described in greater detail herein. FIG. 3 illustrates various components of the computing devices 40 described herein, which facilitate the provider employees 56 interacting with the greenhouse gas emission quantification and reduction system 24 of FIG. 2, as described in greater detail herein. It will be appreciated that the external computing systems 42 described herein may include similar components to also facilitate provider employees 56 interacting with the greenhouse gas emission quantification and reduction system 24, as described in greater detail herein.

In certain embodiments, the computing device(s) 40 may include one or more processor(s) 58. In certain embodiments, the processor(s) 58 may be operatively connected to one or more storage media 60, and may execute coded instructions, such as applications 62, present in the storage media 60. In certain embodiments, the processor(s) 58 may execute, among other things, the machine-readable coded instructions to implement the techniques described herein. In certain embodiments, the applications 62 stored in the storage media 60 may include program instructions or computer program code that, when executed by the processor(s) 58 of the computing device(s) 40, may facilitate the greenhouse gas emission quantification and reduction system 24 performing the techniques described herein. In certain embodiments, the processor(s) 58 may include one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

In certain embodiments, the storage media 60 may include random access memory (RAM), static random access memory (SRAM), synchronous dynamic random access memory (SDRAM), dynamic random access memory (DRAM), RAMBUS dynamic random access memory (RDRAM), and/or other types of random access memory devices. In addition, in certain embodiments, the storage media 60 may include read-only memory, flash memory, and/or other types of memory devices.

In certain embodiments, the computing device(s) 40 may include one or more input device(s) 64, which may permit provider employees 56 to make certain inputs to the greenhouse gas emission quantification and reduction system 24. In certain embodiments, the input device(s) 64 may include a keyboard, a mouse, a joystick, a touchscreen, a trackpad, and/or a trackball. In addition, in certain embodiments, the input device(s) 64 may include a facial recognition device, voice recognition device, and/or biometric data entry device, among other examples, which may be used to authenticate a provider employee 56 associated with the respective computing device 40 for the purpose of authorizing entry and/or access to various information associated with the particular provider employee 56 that is managed by the greenhouse gas emission quantification and reduction system 24. For example, in certain embodiments, a provider employee 56 may be identified by the input device(s) 64, and information managed by the greenhouse gas emission quantification and reduction system 24 may be accessed to ensure that the provider employee 56 should be allowed access to certain data, functions, and so forth. In certain embodiments, the computing device(s) 40 may include one or more audio-visual output device(s) 66, which may permit provider employees 56 to view, hear, feel, and so forth, certain outputs (e.g., alarms, warnings, instructions, and so forth) relating to information managed by the greenhouse gas emission quantification and reduction system 24. In certain embodiments, the audiovisual output device(s) 66 may include video output devices (e.g., an LCD, an LED display, a CRT display, a touchscreen, etc.), speakers, and haptic feedback devices, among other examples.

In certain embodiments, the computing device(s) 40 may also include one or more sensor(s) 68 that facilitate collection of certain data. For example, in certain embodiments, the one or more sensor(s) 68 may include global positioning systems and/or facial recognitions systems, for example, configured to provide information relating to a location of the respective computing device 40 and, by extension, of a provider employee 56 associated with the respective computing device 40, wherein the location information may be used by the greenhouse gas emission quantification and reduction system 24 to approximate a location of the provider employee 56, for example, with respect to the oil and gas worksite 10 and/or particular equipment of the oil and gas worksite 10. In addition, in certain embodiments, the sensor(s) 68 may include cameras configured to, for example, take pictures of the provider employees 56, pictures of the oil and gas worksite 10, pictures of particular equipment of the oil and gas worksite 10, and so forth, which may then be managed by the greenhouse gas emission quantification and reduction system 24.

In certain embodiments, the computing device(s) 40 may also include a communication circuitry 70, which may include various types of standard interfaces, such as an Ethernet interface, a universal serial bus (USB), a third generation input/output (3GIO) interface, a wireless interface, a cellular interface, and/or a satellite interface, among others. In certain embodiments, the communication circuitry 70 may also include a communication device, such as a modem or network interface card to facilitate exchange of data with the greenhouse gas emission quantification and reduction system 24, the various sensors 12, the mobile platforms 26, equipment located at the oil and gas worksite 10, and/or external computing systems 42 to facilitate the functionality of the greenhouse gas emission quantification and reduction system 24, as described in greater detail herein.

The embodiments described herein enable a turnkey methane emissions quantification and reduction service to be offered by a single provider using the greenhouse gas emission quantification and reduction system 24. This integrated, end-to-end service includes all activities required to measure emissions rates and to reduce those rates to a customer-defined target in the most efficient manner possible. As described in greater detail herein, the greenhouse gas emission quantification and reduction system 24 is configured to execute a plurality of various data analysis and processing modules 32 to enable the greenhouse gas emission quantification and reduction system 24 to perform the functionality described herein.

Figure 4:
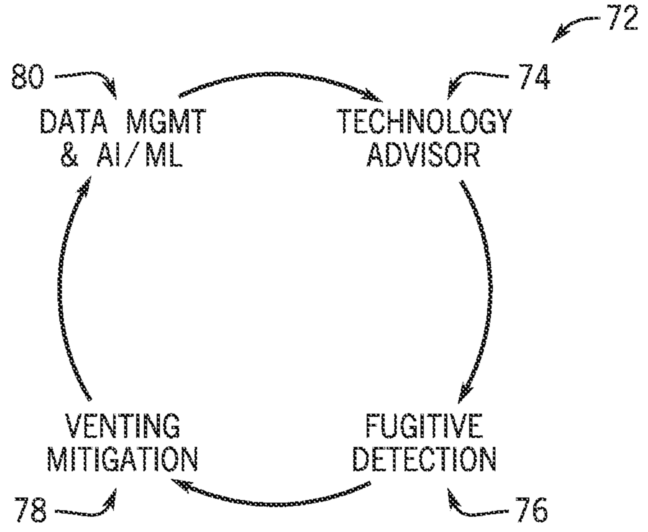
FIG. 4 illustrates an exemplary service workflow that is enabled by the various data analysis and processing modules of the greenhouse gas emission quantification and reduction system of FIG. 2, in accordance with embodiments of the present disclosure.

FIG. 4 illustrates an exemplary service workflow 72 that is enabled by the various data analysis and processing modules 32 of the greenhouse gas emission quantification and reduction system 24 of FIG. 2, as described in greater detail herein. In particular, the integrated, end-to-end service 72 enabled by the various data analysis and processing modules 32 of the greenhouse gas emission quantification and reduction system 24 include job planning 74 (e.g., using technology advisors), fugitive gas leak detection and repair 76, venting mitigation 78, and data management 80. As illustrated in FIG. 4, in certain embodiments, the data management 80 functionality may include implementing artificial intelligence (AI) and machine learning. As illustrated, the service workflow 72 may form a cycle of iterative steps over time, where at least some of the steps 74, 76, 78, 80 may be repeated in an iterative manner. For example, after developing a greenhouse gas emission reduction plan (step 74), implementing the greenhouse gas emission reduction plan (steps 76 and 78), and collecting data (step 80), patterns in the gas emissions data (e.g., if many gas emissions come from a certain kind of facility, such as facilities with separators) may be identified. Then, the process could be repeated by making a new greenhouse gas emission reduction plan, where the new greenhouse gas emission reduction plan would be informed by the data and patterns discovered in the previous iteration (e.g., in step 80). The new greenhouse gas emission reduction plan may also reflect a new goal, for example, if the customer wants to reduce emissions by a certain amount in a first year, by a slightly larger amount in a second year, and so forth.

The service workflow 72 illustrated in FIG. 4 enables customers to simply provide a goal for an emissions reduction, and a single provider performs all of the functionality to achieve the goal. For example, often a customer may set a goal of reducing emissions by a certain percentage (e.g., reducing emissions to 50% of previous emissions) or reducing emissions intensity to a certain threshold (e.g., emitting less than 1% of gas produced). The provider uses the end-to-end service workflow 72 to determine the most cost-effective way to achieve the goal, perform the work to achieve the goal, and perform measurements to validate that the goal has been achieved. In addition, in certain circumstances, the provider may advise the customer on what types of greenhouse gas emission reduction goals are being set by their competitors, how certain greenhouse gas emission reduction goals are viewed by governments, investors, and environmentalists, and so forth, to enable the customer to make an informed decision related to a desired goal.

As but one non-limiting example, in certain situations, a customer may select a goal for reducing methane emissions from a set of upstream/midstream oil and gas worksites 10. For example, a customer may wish to reduce emissions intensity to 1% of gas emitted and/or of gas produced, and the customer may further wish to comply with all applicable emissions regulations.

In response, a provider employee 56 may determine a most effective way to achieve the goal using the greenhouse gas emission quantification and reduction system 24. In certain embodiments, the greenhouse gas emission quantification and reduction system 24 may utilize emissions modeling tools to make this determination. For example, a provider employee 56 may determine that the most cost-effective approach to meet the goal is to install instrument air systems on all pneumatic devices at the oil and gas worksites 10 being monitored, to install continuous emissions monitors at all oil and gas worksites 10 with two or more storage tanks 16, and inspect for gas leaks four times per year with an airplane-mounted system and one time per year with an optical gas imaging camera at all oil and gas worksites 10 with fewer than two storage tanks 16.

In addition, a provider employee 56 may perform leak detection and repair (LDAR) work, as suggested by the greenhouse gas emission quantification and reduction system 24 in the previous step, to reduce unintended (e.g., fugitive) methane emissions. For example, as discussed above, a provider employee 56 may install continuous emissions monitors on all oil and gas worksites 10 with two or more storage tanks 16, and inspect for gas leaks four times per year with an airplane-mounted system and one time per year with an optical gas imaging camera at all oil and gas worksites 10 with fewer than two storage tanks 16. In general, when a gas leak is discovered by the greenhouse gas emission quantification and reduction system 24 using any of these tools, a provider employee 56 may repair the gas leak. In addition, in certain embodiments, a provider employee 56 may ensure that this work satisfies applicable regulatory requirements. In addition, in certain embodiments, a provider employee 56 may apply for an alternative means of emissions limiting (AMEL) exemption, as necessary. Each one of these work steps may be logged via the greenhouse gas emission quantification and reduction system 24 and considered in future calculations by the greenhouse gas emission quantification and reduction system 24. In addition, the process of ensuring regulatory compliance, and so forth, may also be logged via the greenhouse gas emission quantification and reduction system 24.

In addition, a provider employee 56 may also perform venting mitigation work to reduce intended (e.g., vented) methane emissions. For example, a provider employee 56 may install instrument air systems on all pneumatic devices. In general, provider employees 56 may follow best practices to minimize vented emissions, such as capturing blowdown gas.

In addition, a provider employee 56 may manage the resulting data, including regulatory recordkeeping and reporting, as well as corporate level reporting using the greenhouse gas emission quantification and reduction system 24. For example, as described in greater detail herein, the greenhouse gas emission quantification and reduction system 24 may analyze data collected by the various sensors 12 described herein to quantify emissions, and to validate that the goal set by the customer is met. In addition, the greenhouse gas emission quantification and reduction system 24 may also analyze the data to identify trends in the emissions (e.g., using methods in data science, in certain embodiments), and may use these trends to identify a most cost-effective way to meet future emission reduction goals.

In addition, a provider employee 56 may use the greenhouse gas emission quantification and reduction system 24 to file reports to the Environmental Protection Agency (EPA), as well as other federal and state regulatory agencies, to demonstrate that certain oil and gas worksites 10 have been inspected for emissions in a way that complies with the certain regulations (e.g., EPA Subpart OOOOa regulations). For example, the greenhouse gas emission quantification and reduction system 24 may determine that emissions intensity is 0.8%, thereby meeting the target goal. In response, in certain embodiments, the greenhouse gas emission quantification and reduction system 24 may use machine learning to determine that most gas leaks come from oil and gas worksites 10 with at least one separator, for example. Based on this, the greenhouse gas emission quantification and reduction system 24 may develop a plan for a next cycle of emissions quantification and reduction in which oil and gas worksites 10 with one or more separators will be inspected for gas leaks eight times per year with an airplane-mounted system and once per year with an optical gas imaging camera; whereas if the oil and gas worksites 10 do not have a separator, they will be inspected twice per year with an airplane-mounted system and once every other year with an optical gas imaging camera. In certain embodiments, the data collected by the greenhouse gas emission quantification and reduction system 24 may also be used to certify that the customer's hydrocarbons are produced with low associated methane emissions.

Figure 5:
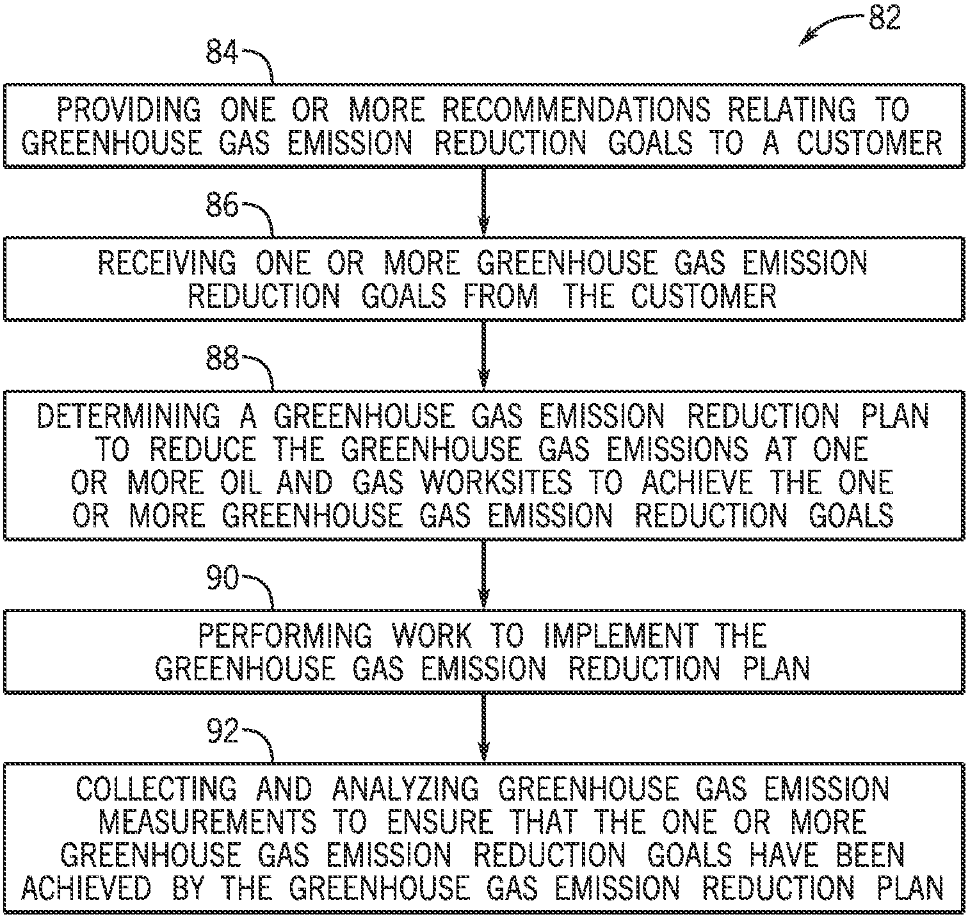
FIG. 5 is a flow diagram of a process for providing greenhouse gas emission quantification and reduction functions by provider employees of a single provider, in accordance with embodiments of the present disclosure.

FIG. 5 is a flow diagram of a process 82 for providing greenhouse gas emission quantification and reduction functions by provider employees 56 of a single provider. As described in greater detail herein, performance of the greenhouse gas emission quantification and reduction functions described herein may be facilitated by the greenhouse gas emission quantification and reduction system 24 of FIG. 2. As illustrated in FIG. 5, in certain embodiments, the process 82 may include providing one or more recommendations relating to greenhouse gas emission reduction goals to a customer (block 84). For example, in certain circumstances, the provider may advise the customer on what types of greenhouse gas emission reduction goals are being set by their competitors, how certain greenhouse gas emission reduction goals are viewed by governments, investors, and environmentalists, and so forth, to enable the customer to make an informed decision related to a desired goal.

In addition, in certain embodiments, the process 82 may include receiving one or more greenhouse gas emission reduction goals from the customer, wherein the one or more greenhouse gas emission reduction goals relate to a reduction in greenhouse gas emissions at one or more oil and gas worksites 10 associated with (e.g., owned by, operated by, and so forth) the customer (block 86). In certain embodiments, the one or more greenhouse gas emission reduction goals received from the customer may include a percentage reduction in greenhouse gas emissions at the one or more oil and gas worksites 10 during a subsequent time period as compared to a previous time period. For example, the customer may note that current greenhouse gas emissions from the one or more oil and gas worksites 10 (e.g., during a current time period) are at a certain amount, and that a greenhouse gas emission reduction goal of the customer is to reduce future greenhouse gas emissions from the one or more oil and gas worksites 10 (e.g., during a subsequent time period) by at least a certain amount (e.g., at least a 50% reduction in greenhouse gas emissions from the one or more oil and gas worksites 10). In addition, in certain embodiments, the one or more greenhouse gas emission reduction goals received from the customer may include a maximum threshold of greenhouse gas emissions at the one or more oil and gas worksites 10 as a percentage of gas processed by (e.g., produced from, delivered through, and so forth) the one or more oil and gas worksites 10. For example, the customer may desire to emit less than 1% of gas that is processed by the one or more oil and gas worksites 10 for any given time period. In addition, in certain embodiments, the one or more greenhouse gas emission reduction goals received from the customer may include a maximum threshold of greenhouse gas emissions at the one or more oil and gas worksites 10 as a percentage of energy (e.g., including both oil and gas, in certain embodiments) processed by (e.g., produced from, delivered through, and so forth) the one or more oil and gas worksites 10. In addition, in certain embodiments, the one or more greenhouse gas emission reduction goals received from the customer may include compliance with one or more greenhouse gas emission regulations, for example, which may require certain operating equipment and/or operating procedures at the one or more oil and gas worksites 10.

In addition, in certain embodiments, the process 82 may include determining a greenhouse gas emission reduction plan to reduce the greenhouse gas emissions at the one or more oil and gas worksites 10 to achieve the one or more greenhouse gas emission reduction goals (block 88). As described in greater detail herein, the determination of the greenhouse gas emission reduction plan may take into account the cost of different greenhouse gas emission reduction plan alternatives. For example, while one candidate greenhouse gas emission reduction plan may facilitate high levels of greenhouse gas emission reduction, another candidate greenhouse gas emission reduction plan may cost less while still achieving all of the greenhouse gas emission reduction goals.

In addition, in certain embodiments, the process 82 may include performing work to implement the greenhouse gas emission reduction plan (block 90). For example, in certain embodiments, performing the work to implement the greenhouse gas emission reduction plan may include performing gas LDAR work at the one or more oil and gas worksites 10, as described in greater detail herein. In addition, in certain embodiments, performing the LDAR work may include applying for an AMEL exemption, among other things. In addition, in certain embodiments, performing the work to implement the greenhouse gas emission reduction plan may include performing gas venting mitigation work at the one or more oil and gas worksites 10. In addition, in certain embodiments, performing the work to implement the greenhouse gas emission reduction plan may include reducing flaring at the one or more oil and gas worksites 10.

In addition, in certain embodiments, the process 82 may include collecting and analyzing gas emission measurements (e.g., via the sensors 12 and the gas emission quantification and reduction system 24) to ensure that the one or more greenhouse gas emission reduction goals have been achieved by the greenhouse gas emission reduction plan (block 92), as described in greater detail herein. In addition, in certain embodiments, the process 82 may include preparing and filing one or more reports with one or more regulatory agencies that the one or more oil and gas worksites 10 are in compliance with one or more greenhouse gas emission regulations. In addition, as described in greater detail herein, all of the steps of the process 82 may be performed by one or more provider employees 56 of a single provider as a turn-key service provided to the customer by the single provider.

In addition, certain steps of the process 82 may be computer-enabled by the greenhouse gas emission quantification and reduction system 24, as described in greater detail herein. In particular, as described in greater detail herein, in certain embodiments, the greenhouse gas emission quantification and reduction system 24 may include one or more processors 34 configured to execute computer-executable instructions (e.g., the data analysis and processing modules 32), wherein the computer-executable instructions, when executed by the one or more processors 34, cause the one or more processors 34 to receive one or more greenhouse gas emission reduction goals provided by a customer (e.g., via the greenhouse gas emission quantification and reduction system 24), wherein the one or more greenhouse gas emission reduction goals relate to a reduction in greenhouse gas emissions at one or more oil and gas worksites 10 associated with (e.g., owned by, operated by, and so forth) the customer; to determine a greenhouse gas emission reduction plan to reduce the greenhouse gas emissions at the one or more oil and gas worksites 10 to achieve the one or more greenhouse gas emission reduction goals (e.g., via the greenhouse gas emission quantification and reduction system 24); to receive information relating to work performed by one or more provider employees 56 to implement the greenhouse gas emission reduction plan; and to collect and analyze gas emission measurements (e.g., via the sensors 12 and the greenhouse gas emission quantification and reduction system 24) to ensure that the one or more greenhouse gas emission reduction goals have been achieved by the greenhouse gas emission reduction plan.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

In the claims, means-plus-function clauses are intended to cover the structures described herein as performing the recited function and not only structural equivalents, but also equivalent structures. Thus, for example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method, comprising:

(a) providing one or more recommendations relating to greenhouse gas emission reduction goals to a customer;

(b) receiving one or more greenhouse gas emission reduction goals from the customer, the one or more greenhouse gas emission reduction goals relating to a reduction in greenhouse gas emissions at one or more oil and gas worksites associated with the customer;

(c) determining a greenhouse gas emission reduction plan to reduce the greenhouse gas emissions at the one or more oil and gas worksites to achieve the one or more greenhouse gas emission reduction goals;

(d) performing work to implement the greenhouse gas emission reduction plan to reduce greenhouse gas emissions, the work comprising one or more of:

performing gas leak detection and repair work at the one or more oil and gas worksites;

performing gas venting mitigation work at the one or more oil and gas worksites;

or reducing flaring at the one or more oil and gas worksites;

(e) collecting and analyzing greenhouse gas emission measurements to ensure that the one or more greenhouse gas emission reduction goals have been achieved by the greenhouse gas emission reduction plan, wherein the one or more greenhouse gas emission reduction goals comprise a percentage reduction in greenhouse gas emissions at the one or more oil and gas worksites during a subsequent time period as compared to a previous time period; and (f) after performing step (e), iteratively repeating steps (b) through (e), the percentage reduction in greenhouse gas emissions in the one or more greenhouse gas emission reduction goals being increased with each iteration.

2. The method of claim 1, wherein the one or more greenhouse gas emission reduction goals comprise a maximum threshold of greenhouse gas emissions at the one or more oil and gas worksites as a percentage of gas processed by the one or more oil and gas worksites.

3. The method of claim 1, wherein the one or more greenhouse gas emission reduction goals comprise a maximum threshold of greenhouse gas emissions at the one or more oil and gas worksites per unit of energy processed by the one or more oil and gas worksites.

4. The method of claim 1, wherein the one or more greenhouse gas emission reduction goals comprise compliance with one or more greenhouse gas emission regulations.

5. The method of claim 1, wherein determining the greenhouse gas emission reduction plan is based at least in part on a cost of the implementation of the greenhouse gas emission reduction plan.

6. The method of claim 1, wherein the performing the gas leak detection and repair work comprises applying for an alternative means of emissions limiting (AMEL) exemption.

7. The method of claim 1, comprising preparing and filing one or more reports with one or more regulatory agencies that the one or more oil and gas worksites are in compliance with one or more greenhouse gas emission regulations.

8. The method of claim 1, wherein steps (a) through (e) are performed by one or more provider employees of a single provider.

9. A greenhouse gas emission quantification and reduction system, comprising:

one or more processors configured to execute computer-executable instructions, the computer-executable instructions, when executed by the one or more processors, causing the one or more processors to:

(a) provide one or more recommendations relating to greenhouse gas emission reduction goals to a customer;

(b) receive one or more greenhouse gas emission reduction goals provided by the customer, the one or more greenhouse gas emission reduction goals relating to a reduction in greenhouse gas emissions at one or more oil and gas worksites associated with the customer;

(c) determine a greenhouse gas emission reduction plan to reduce the greenhouse gas emissions at the one or more oil and gas worksites to achieve the one or more greenhouse gas emission reduction goals;

(d) receive information relating to work performed by one or more provider employees to implement the greenhouse gas emission reduction plan to reduce greenhouse gas emissions, the work comprising one or more of:

performing gas leak detection and repair work at the one or more oil and gas worksites;

performing gas venting mitigation work at the one or more oil and gas worksites; or reducing flaring at the one or more oil and gas worksites;

(e) collect and analyze greenhouse gas emission measurements to ensure that the one or more greenhouse gas emission reduction goals have been achieved by the greenhouse gas emission reduction plan, wherein the one or more greenhouse gas emission reduction goals comprise a percentage reduction in greenhouse gas emissions at the one or more oil and gas worksites during a subsequent time period as compared to a previous time period; and (f) after performing step (e), iteratively repeating steps (b) through (e), the percentage reduction in greenhouse gas emissions in the one or more greenhouse gas emission reduction goals being increased with each iteration.

10. The greenhouse gas emission quantification and reduction system of claim 9, wherein the determining the greenhouse gas emission reduction plan is based at least in part on a cost of the implementation of the greenhouse gas emission reduction plan.

11. The greenhouse gas emission quantification and reduction system of claim 9, wherein the work performed by the one or more provider employees comprises gas leak detection and repair work at the one or more oil and gas worksites.

12. The greenhouse gas emission quantification and reduction system of claim 9, wherein the work performed by the one or more provider employees comprises gas venting mitigation work at the one or more oil and gas worksites.

13. The greenhouse gas emission quantification and reduction system of claim 9, wherein the work performed by the one or more provider employees comprises reducing flaring at the one or more oil and gas worksites.

14. A computer-enabled method, comprising:

(a) providing one or more recommendations relating to greenhouse gas emission reduction goals to a customer;

(b) receiving one or more greenhouse gas emission reduction goals provided by the customer, the one or more greenhouse gas emission reduction goals relating to a reduction in greenhouse gas emissions at one or more oil and gas worksites associated with the customer;

(c) determining a greenhouse gas emission reduction plan to reduce the greenhouse gas emissions at the one or more oil and gas worksites to achieve the one or more greenhouse gas emission reduction goals;

(d) receiving information relating to work performed by one or more provider employees to implement the greenhouse gas emission reduction plan to reduce greenhouse gas emissions, the work comprising one or more of:

performing gas leak detection and repair work at the one or more oil and gas worksites;

performing gas venting mitigation work at the one or more oil and gas worksites;

or reducing flaring at the one or more oil and gas worksites;

(e) collecting and analyzing greenhouse gas emission measurements to ensure that the one or more greenhouse gas emission reduction goals have been achieved by the greenhouse gas emission reduction plan, wherein the one or more greenhouse gas emission reduction goals comprise a percentage reduction in greenhouse gas emissions at the one or more oil and gas worksites during a subsequent time period as compared to a previous time period; and (f) after performing step (e), iteratively repeating steps (b) through (e), the percentage reduction in greenhouse gas emissions in the one or more greenhouse gas emission reduction goals being increased with each iteration.

15. The method of claim 1, further comprising automatically sending one or more control signals to one or more pieces of equipment at the one or more oil and gas worksites to adjust one or more operational parameters in response to detecting a gas emission.

16. The method of claim 1, wherein the collecting and analyzing greenhouse gas emission measurements comprises correlating gas concentration time-series data with operational events detected by equipment-status sensors to infer a likelihood of a gas leak.

* * * * *